United States Patent [19]

Aizawa et al.

[11] Patent Number: 4,968,971
[45] Date of Patent: Nov. 6, 1990

[54] METHOD OF SPOT WELDING PARTS OF AN ELECTROMAGNETIC BELL UNIT

[75] Inventors: Junichi Aizawa; Satoru Yamauchi; Shoichiro Kumazawa; Natsuki Hashiba; Tomohiro Wada, all of Tokyo, Japan

[73] Assignee: Seikosha Co., Ltd., Japan

[21] Appl. No.: 210,812

[22] Filed: Jun. 24, 1988

Related U.S. Application Data

[62] Division of Ser. No. 51,473, May 18, 1987, Pat. No. 4,912,453.

[30] Foreign Application Priority Data

May 16, 1986 [JP] Japan ................... 61-73565
Oct. 2, 1986 [JP] Japan ................. 61-234993
Oct. 28, 1986 [JP] Japan ................. 61-165140

[51] Int. Cl.⁵ ............................................. G08B 3/00
[52] U.S. Cl. ................................. 340/396; 219/69.15; 219/83
[58] Field of Search ............. 219/69.15, 69.17, 80, 219/83; 116/148, 149, 155, 160, 162, 164, 167; 340/396, 388

[56] References Cited

U.S. PATENT DOCUMENTS 3,148,698  9/1964  Kaplan .................. 116/158
4,465,915  8/1984  Corcelle ............... 219/69.17

Primary Examiner—Leo P. Picard
Assistant Examiner—Lincoln Donovan
Attorney, Agent, or Firm—Bruce L. Adams; Van C. Wilks

[57] ABSTRACT

A miniaturized electromagnetic bell unit suitable for use with an alarm clock and the like is provided.

The bell unit of the present invention is characterized in that it is miniaturized in such a way that a yoke to which a coil and a bell hammer are attached is incorporated within a bell and the bell is fixed to the yoke. Besides the simplicity of its structure, the advantages of the present invention are that the bell hammer can be adjusted in a simple manner through a hole drilled in the bottom of the bell; both the bell and the yoke are held fixed together simply and firmly such that a positioner is inserted into holes drilled correspondingly through the bell and the yoke while at the same time, an arm integrally extending from the yoke is fixed to a fixing member; and further, another hole is drilled in the bottom of the bell and one of two electrodes is inserted into the bell thorugh the hole while the other electrode is brought into contact with the outer surface of the bell whereby the yoke and the bell are spot-welded to each other simply and securely.

17 Claims, 3 Drawing Sheets

METHOD OF SPOT WELDING PARTS OF AN ELECTROMAGNETIC BELL UNIT

This is a rule 60 divisional application of parent application Ser. No. 051,473 filed May 18, 1987, now U.S. Pat. No. 4,912,453.

BACKGROUND OF THE INVENTION

A bell unit.

A conventional electromagnetic bell unit is shown in FIG. 8 and has a drive block 20 comprising a bell hammer 17 fixed with a hammer head 15 and a movable yoke 16, a coil 18 and a yoke 19 is provided outside a bell 21 and both the bell 21 and the drive block 20 are fixed to a fixing member 22.

However, the electromagnetic bell unit of the above structure has the drawback that since the drive block 20 is provided outside the bell 21, the entire space occupied by the unit becomes so large that it is difficult for a small-sized block to be provided with the bell unit.

In addition, since different members are required for mounting the bell hammer and yoke, the number of parts and the amount of time required for assembling the unit innevitably increase resulting in an increase in the manufacturing cost.

SUMMARY OF THE INVENTION

Accordingly, one object of the present invention is to provide an electromagnetic bell unit which is miniaturized and in which the number of parts and the amount of assembly time are considerably reduced.

Another object of the present invention is to provide an electromagnetic bell unit in which the bell hammer of the unit can be adjusted in a simple manner even after the unit is assembled.

A further object of the present invention is to provide a miniaturized electromagnetic bell unit having a fitting structure strong enough to withstand impacts applied thereon due to falling and the like.

Another object of the present invention is to provide a method of welding a bell and a yoke of an electromagnetic bell unit firmly and in a simple manner.

DETAILED DESCRIPTION OF THE INVENTION

Figure 1:
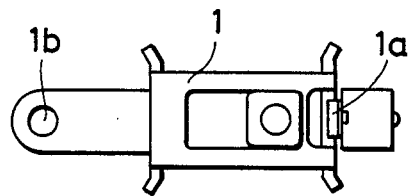
FIG. 1 is a plane view of an embodiment of a drive block according to the present invention.
Figure 2:
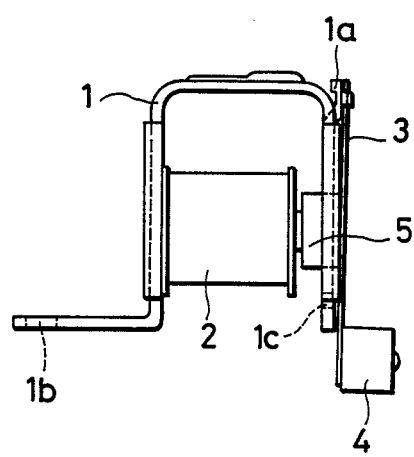
FIG. 2 is a front view of the drive block.
Figure 3:
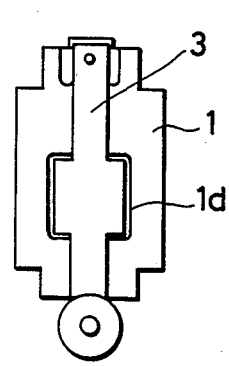
FIG. 3 is a right side view of the drive block.

In FIGS. 1 through 3 which show a drive block assembly according to the present invention, reference numeral 1 designates a yoke held stationary so as to surround an energyable coil 2. The yoke 1 has a bell hammer fixing section bendable projection or projected portion 1a defining formed integral with one of the corners thereof so as to extend upward. Further, at one end of the yoke 1, there is provided a hole 1b through which the yoke is screwed to the frame of a clock and at the other end, there is provided a snap-fitting hole 1c for fixing the yoke 1 more firmly to the clock frame. Reference numeral 3 designates a bell hammer which is fixed to the fixing section 1a of the yoke 1 at one end thereof by calking, soldering or resistance welding. The bell hammer 3 is provided with a hammer head 4 at the other end thereof and a movable yoke 5 made of a magnetic material at substantially the center thereof. The movable yoke 5 is inserted into a hole 1d drilled in the yoke 1.

Figure 4:
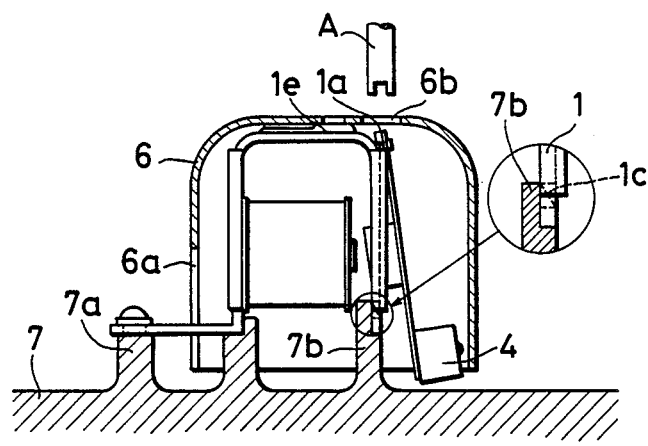
FIG. 4 is a sectional view of the drive block of FIG. 1 in a state in which the drive block is fixed to a frame housing a bell therein.

The drive block assembly of the above structure is incorporated into a dome shaped bell 6 as shown in FIG. 4, and the bottom of the bell 6 is fixed to the yoke 1 through a dowel 1e of the yoke 1 by a screw, calking or resistance welding. The bell 6 is provided with a recess 6a through which one end of the yoke 1 is drawn out so as to be screwed to a fixing section 7a extending upright from the frame or support structure 7 of the clock. The other end of the yoke 1 makes a snap-fit with a fixing section 7b of the frame 7 so that the yoke 1 is firmly fixed to the frame 7. As a consequence, even when an external shock or impact is applied to the yoke 1 due to the falling of the clock, there is little danger of the yoke being dislocated from the clock.

By suitably energizing the coil 2, the movable yoke 56 is driven back and forth to vibrate the hammer head 4 which strikes the bell 6 to produce a bell sound.

Further, the bell 6 is provided with a hole 6b so that the fixing section 1a of the yoke 1 can be adjusted by the insertion and of a jig manipulation A into the tool hole. That is, by adjusting the rising angle of the bell hammer 3 by bending the projection or projected portion 1a, the distance between the hammer head 4 and the bell 6 is adjusted so that the adjustment of the sound volume and quality is facilitated even after the bell unit is assembled into the clock.

Figure 5:
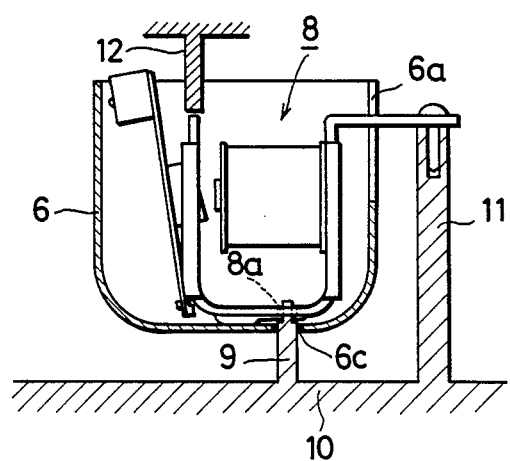
FIG. 5 is a sectional view of the drive block of FIG. 1 showing the drive block fixed to a different frame from that shown in FIG. 4.

FIG. 5 shows another embodiment of the drive block fitting structure according to the present invention wherein reference numeral 8 designates a drive block substantially the same as the first-mentioned embodiment. As shown, the drive block 8 includes a yoke having a hole or opening 8a, and at the bottom of the bell 6 or opening there is provided a hole 6c slightly larger than, and drilled at a position corresponding to, the hole 8a. In this embodiment, the bell 6 is disposed with the dome-shaped part thereof adjacent a support structure 10.

The support structure of frame 10 of a clock is provided with a positioning member or part 9 and a fixing member or part 11 in the form of a pole, both of which extend upright from the frame 10.

With the above structure, when the positioning member 9 is fitted into the hole 6c of the bell 6 and the hole 8a of the yoke and then an arm portion of the yoke is screwed to the fixing member 11, the entire drive block is fixed to the frame 10. As a consequence, it is possible to fix the drive block simply and firmly by screwing the block to the frame at a single spot.

Further, the diameter of the hole 6c of the bell 6 is made larger than that of the positioning member 9 to provide a clearance therebetween so that the bell and the positioning member 9 do not come into contact with each other. Therefore, the bell 6 comes into contact only with the yoke at the bottom of the former thereby keeping a favorable sound volume.

Designated by reference numeral 12 is a stop rod formed integral with, or separately attached to, the frame 10 with its top end facing one end of the yoke leaving a small clearance from the latter. The stop rod 12 is suitably adjusted to prevent the yoke from becoming dislocated or deformed due to a possible impact resulting from the falling of the clock or other causes. For example, in case an external shock or impact is applied on the yoke in the upward direction in the state of FIG. 5 due to the falling of the clock, one end of the yoke will abut against the top end of the stop rod 12 so that the dislocation of the screw-fastening section of the yoke with respect to the clock frame or deformation thereof is prevented.

Figure 6:
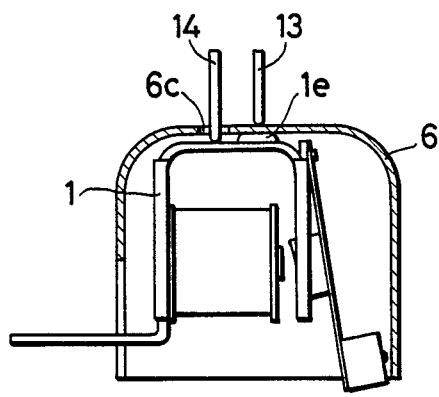
FIG. 6 is a front view (partially broken away) showing how the drive block is spot-welded to the bell.
Figure 7:
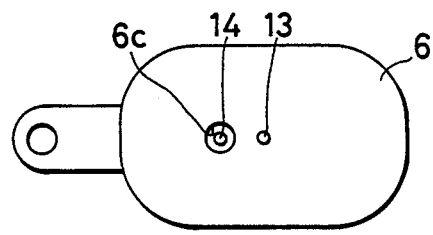
FIG. 7 is a plane view of the structure shown in FIG. 6.
Figure 8:
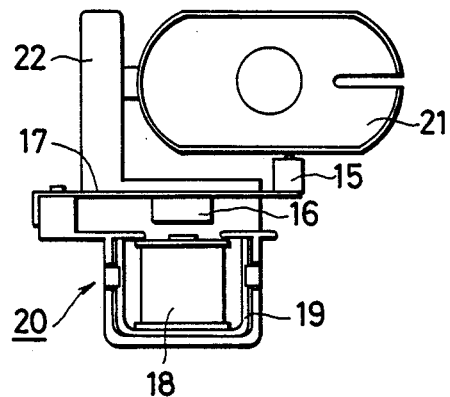
FIG. 8 is a front view of a conventional electro-magnetic bell unit.

Next, a method of spot-welding the bell and the yoke will be described. In FIGS. 6 and 7, the dowel 1e formed with the yoke 1 is pressed against the bell 6 at a suitable pressure in a limited contact area, and a spot-welding electrode 13 is brought into contact with the bottom of the bell 6. At the same time, another welding electrode 14 is brought into contact with the yoke 1 by inserting the electrode into the hole 6c of the bell 6. Then, when an electric voltage is applied across the electrode 13 and 14 in the above state, current flows through the electrode 13, the bell 6, the dowel 1a, the yoke 1 and the electrode 14 ahd as a result, the dowel 1e is spot-welded to the bell 6 at the limited contact area.

Thus, even in case the electrode 14 can not be inserted into the bell 6 from the open side thereof because of the existence of the coil within the yoke, the spot-welding of the yoke and bell is possible. Moreover, there is almost no trace of welding on the outer bottom surface of the bell so that the external appearance of the bell is not spoiled.

According to the present invention, the drive block assembly comprising the coil, yoke and bell hammer is housed within the bell and the bell is fixed to the yoke of the block so that the entire structure of the bell unit is miniaturized, the fitting structure of the unit is simplified and the number of parts and the assembly time are reduced thereby lowering the manufacturing cost.

Further, as the bell hammer adjusting hole is drilled in the bottom surface of the bell, the angle of the bell hammer can be adjusted in a simple manner even after assembly, and the distance between the hammer head and the bell can also be adjusted.

In addition, the bell and the yoke can be fixed simply and firmly by inserting the positioning member into the holes of the bell and yoke and then fastening the arm portion of the yoke to the fixing member. In this case, as the yoke is directly fastened to the fixing member, the bell is kept out of contact with the other members and the quality of sound of the bell is not affected adversely thereby assuring a favorable sound.

Moreover, due to the fact that the bell and the yoke are spot-welded by bringing one of the welding electrodes into contact with the yoke through the hole in the bottom surface of the bell, even in case the electrode can not be inserted into the bell from the open side of the latter because of the existence of the coil, spot-welding of a sufficient strength can be performed in a simple manner. Further, since each of the welding electrodes can be used from the same direction, the welding operation is simplified and as there is no trace of welding, the external appearance of the bell unit is not spoiled.

What is claimed:

1. A method of welding a bell of an electromagnetic bell unit and a yoke characterized by the steps of:
   housing the yoke within the bell;
   bringing the yoke into contact with the inner bottom surface of the bell with a small area of contact;
   drilling a hole through the bottom of the bell and bringing a first electrode into contact with the bell while bringing a second electrode into contact with the yoke through the hole; and
   applying an electric current across the first and the second electrode so that the contact area of the bell and the yoke is spot-welded.

2. A method of spot welding first and second electrically conductive members to each other, comprising: establishing contact between the first and second members in a limited contact area only; establishing contact between a first electrode and the first member; passing a second electrode through an aperture in the first member to a position in which it contacts the second member; and passing an electrical current through the first and second electrodes so as to spot weld the first and second members to each other at the said limited contact area.

3. A method as claimed in claim 2; in which the second member is mounted within a space in the first member.

4. A method as claimed in claim 3; in which the first member is U-shaped, the said limited contact area being disposed at the base portion of the U-shaped first member.

5. A method as claimed in claim 4; in which the second member has a projection which contacts the first member in the said limited contact area, the first and second members being spaced from each other except at the said projection.

6. A method as claimed in claim 3; in which the second member has a projection which contacts the first member in the said limited contact area, the first and second members being spaced from each other except at the said projection.

7. A method as claimed in claim 2; in which the second member has a projection which contacts the first member in the said limited contact area, the first and second members being spaced from each other except at the said projection.

8. A method as claimed in claim 2; in which the first member comprises a bell and the second member comprises a frame mounted within the bell, the frame carrying both a bell hammer and electromagnetic means for moving the bell hammer into and out of a position in which it strikes the bell.

9. A method as claimed in claim 7; in which the electromagnetic means comprises a coil carried by the frame and an armature carried by the bell hammer and being spaced from the coil when the latter is deenergized, energization of the coil causing the armature to be attracted to the coil.

10. A method as claimed in claim 9; in which one end of the bell hammer is secured to the frame by an adjustable fixing device which enables the spacing between a hammer head of the bell hammer, when at rest, and the bell to be adjusted.

11. A method as claimed in claim 8; in which one end of the bell hammer is secured to the frame by an adjustable fixing device which enables the spacing between a hammer head of the bell hammer, when at rest, and the bell to be adjusted.

12. A method as claimed in claim 8; in which the frame is U-shaped.

13. A method of spot welding two members, comprising the steps of: providing first and second electrically conductive members, the first member having an aperture therethrough; establishing contact between the first and second members only in a limited contact area at which the two members are to be welded; establishing contact between a first electrode and the first member; inserting a second electrode through the aperture in the first member and establishing contact between the second electrode and the second member without contact between the second electrode and the first member; and flowing an electric current through the first and second electrodes to effect spot welding of the first and second members to each other only at the limited contact area.

14. A method according to claim 13; wherein the first member comprises an enclosure and the second member is configured to fit within the enclosure in spaced relation from the interior surface of the enclosure; and the first establishing step comprises inserting the second member within the enclosure to establish contact between the second member and the interior surface of the enclosure in a limited contact area only.

15. A method according to claim 14; wherein the second member has a projection movable into contact with the interior surface of the enclosure to define the limited contact area.

16. A method according to claim 13; wherein the first member comprises a bell having a base portion and the second member comprises a yoke carrying a bell hammer and a coil; and the first establishing step comprises inserting the yoke within the bell to establish contact between the yoke and the interior surface of the bell base portion.

17. A method according to claim 16; wherein the yoke has a projection movable into contact with the interior surface of the bell to define the limited contact area.

* * * * *